United States Patent
Fukui et al.

(10) Patent No.: US 7,413,232 B1
(45) Date of Patent: Aug. 19, 2008

(54) VEHICLE SEAT LIFTING UNIT

(75) Inventors: Osamu Fukui, Naka-gun (JP); Hiroki Fujikura, Chigasaki (JP)

(73) Assignee: Autech Japan, Inc., Kanagawa (JP)

( * ) Notice: Subject to any disclaimer, the term of this patent is extended or adjusted under 35 U.S.C. 154(b) by 0 days.

(21) Appl. No.: 11/687,712

(22) Filed: Mar. 19, 2007

(51) Int. Cl.
*B60N 2/02* (2006.01)

(52) U.S. Cl. .................. 296/65.09; 296/65.12

(58) Field of Classification Search ......... 296/65.09, 296/65.03, 65.13, 65.11, 65.01, 65.16, 65.17
See application file for complete search history.

(56) References Cited

U.S. PATENT DOCUMENTS

| | | | | |
|---|---|---|---|---|
| 2,641,305 A | * | 6/1953 | Oishei | 296/65.06 |
| 3,172,551 A | * | 3/1965 | Wolfe | 414/550 |
| 3,236,556 A | * | 2/1966 | Lathers | 296/65.08 |
| 3,984,146 A | * | 10/1976 | Krestel et al. | 297/330 |
| 4,155,587 A | * | 5/1979 | Mitchell | 296/65.12 |
| 4,483,653 A | * | 11/1984 | Waite | 414/541 |
| 4,661,035 A | * | 4/1987 | Danielsson | 414/550 |
| 5,301,993 A | * | 4/1994 | Zalewski | 296/65.12 |
| 5,524,952 A | * | 6/1996 | Czech et al. | 296/65.12 |
| 5,540,539 A | * | 7/1996 | Wolfman et al. | 414/541 |
| 6,024,398 A | * | 2/2000 | Horton et al. | 296/65.07 |
| 6,241,209 B1 | * | 6/2001 | von Mayenburg et al. | 248/421 |
| 6,371,431 B1 | * | 4/2002 | Schmidt et al. | 248/419 |
| 6,378,941 B1 | * | 4/2002 | Opfer et al. | 297/257 |
| 6,821,078 B2 | * | 11/2004 | Dudai et al. | 296/65.04 |
| 7,306,421 B2 | * | 12/2007 | Wolfe | 414/541 |
| 2005/0168036 A1 | * | 8/2005 | Wilkinson et al. | 297/378.1 |
| 2007/0194607 A1 | * | 8/2007 | Dudai | 297/1 |
| 2007/0221429 A1 | * | 9/2007 | Fukui et al. | 180/273 |
| 2008/0048477 A1 | * | 2/2008 | Ujimoto et al. | 297/344.1 |

FOREIGN PATENT DOCUMENTS

JP    2001-001812    1/2001

* cited by examiner

*Primary Examiner*—Kiran B. Patel
(74) *Attorney, Agent, or Firm*—Global IP Counselors, LLP (57) ABSTRACT

A vehicle seat lifting unit is provided with a slider and a lift arm assembly that are driven by a drive unit to move a seat with a seat holder between an initial position inside the vehicle occupant compartment and a displaced position outside the vehicle occupant compartment that is lower than the initial position. The lift arm assembly has a pair of arms that cooperate with the slider and the seat holder to form a linkage mechanism. The drive unit moves the slider along the predetermined path between an advance position and a retreat position and causes the first and second arms of the lift arm assembly to selectively swing from backwardly tilted positions to forwardly tilted positions, which in turn selectively shifts the seat between the initial position and the displaced position outside the vehicle occupant compartment that is lower than the initial position.

12 Claims, 11 Drawing Sheets

VEHICLE SEAT LIFTING UNIT

CROSS-REFERENCE TO RELATED APPLICATIONS

This application is related to Japanese Patent Application No. 2005-292545, filed on Oct. 5, 2005. The entire disclosure of Japanese Patent Application No. 2005-292545 is hereby incorporated herein by reference.

BACKGROUND OF THE INVENTION

1. Field of the Invention

The present invention generally relates to seat lifting units for vehicles.

2. Background Information

Conventionally, seat lifting units are used to lower or lift a vehicle seat through a vehicle door opening. A known seat lifting unit of the above kind is described in Japanese Laid Open Patent Publication No. 2001-001812A.

This known seat lifting unit has a function to lower a vehicle seat from an initial position inside a vehicle occupant compartment to a displaced position outside the vehicle occupant and lift the vehicle seat from the displaced position to the initial position. The vehicle seat is retained by a seat holder. The seat holder includes two upright walls standing up along lateral sides of the vehicle seat. Each of the two upright walls is supported by one of two pairs of lift arms.

The seat holder is lowered while it is moving from the initial position inside the vehicle occupant compartment to the displaced position outside the vehicle occupant compartment by turning each of these lift arms in one direction, and it is lifted while it is moving from the displaced position to the initial position by turning each lift arm in the opposite direction.

In view of the above, it will be apparent to those skilled in the art from this disclosure that there exists a need for an improved seat lifting unit. This invention addresses this need in the art as well as other needs, which will become apparent to those skilled in the art from this disclosure.

SUMMARY OF THE INVENTION

However, the conventional seat lifting unit is difficult to install in a vehicle having a narrow indoor width because each of the two pairs of lift arms occupy a space on one of lateral sides of the vehicle occupant seat. In addition, the conventional seat lifting unit fails to accomplish effective use of the vehicle occupant compartment because the lift arms remain occupying the space on each of the lateral sides of the vehicle occupant seat when the backrest takes a backwardly reclined position.

Considering the above-mentioned conventional problems, an object of the present invention is to provide a highly convenient seat lifting unit that is easy to install in a vehicle having a narrow indoor width.

In order to solve the above-mentioned problems, a vehicle seat lifting unit is provided that basically comprises a lower support structure, a slider, a seat, a seat holder, a lift arm assembly and a drive unit. The lower support structure is configured to be pivotally mounted on a floor defining a vehicle occupant compartment of a vehicle. The slider is coupled to the lower support structure to move along a predetermined path relative to the lower support structure. The seat holder is coupled to the seat. The lift arm assembly includes a first arm and a second arm that cooperate with the slider and the seat holder to form a linkage mechanism. Each of the first and second arms includes a base end portion pivotally coupled to the slider and a tip portion pivotally coupled to the seat holder with the lift assembly being located behind the seat. The drive unit is configured to move the slider along the predetermined path between an advance position and a retreat position and to cause the first and second arms of the lift arm assembly to selectively swing from backwardly tilted positions to forwardly tilted positions, which in turn selectively shifts the seat between an initial position inside the vehicle occupant compartment and a displaced position outside the vehicle occupant compartment that is lower than the initial position.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
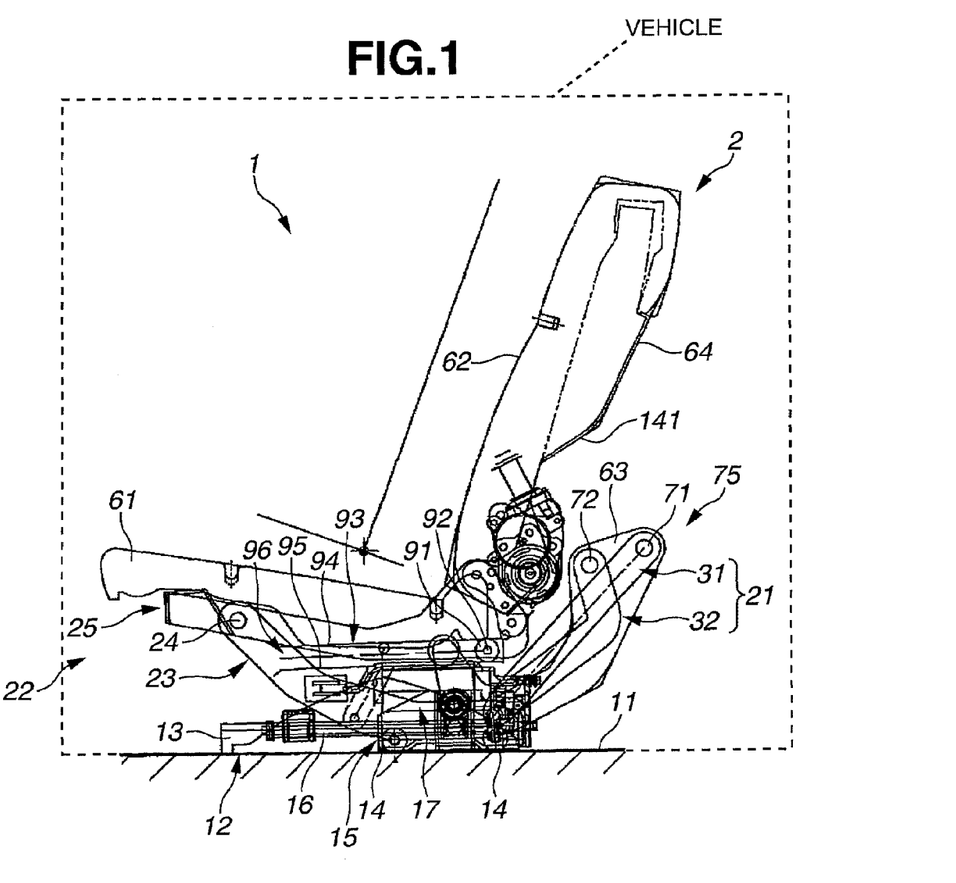
FIG. 1 is a simplified schematic diagram of a vehicle seat lifting unit for a vehicle according to one embodiment of the present invention, illustrating positions of parts when the seat lifting unit is in an initial position inside a vehicle occupant compartment.
Figure 6:
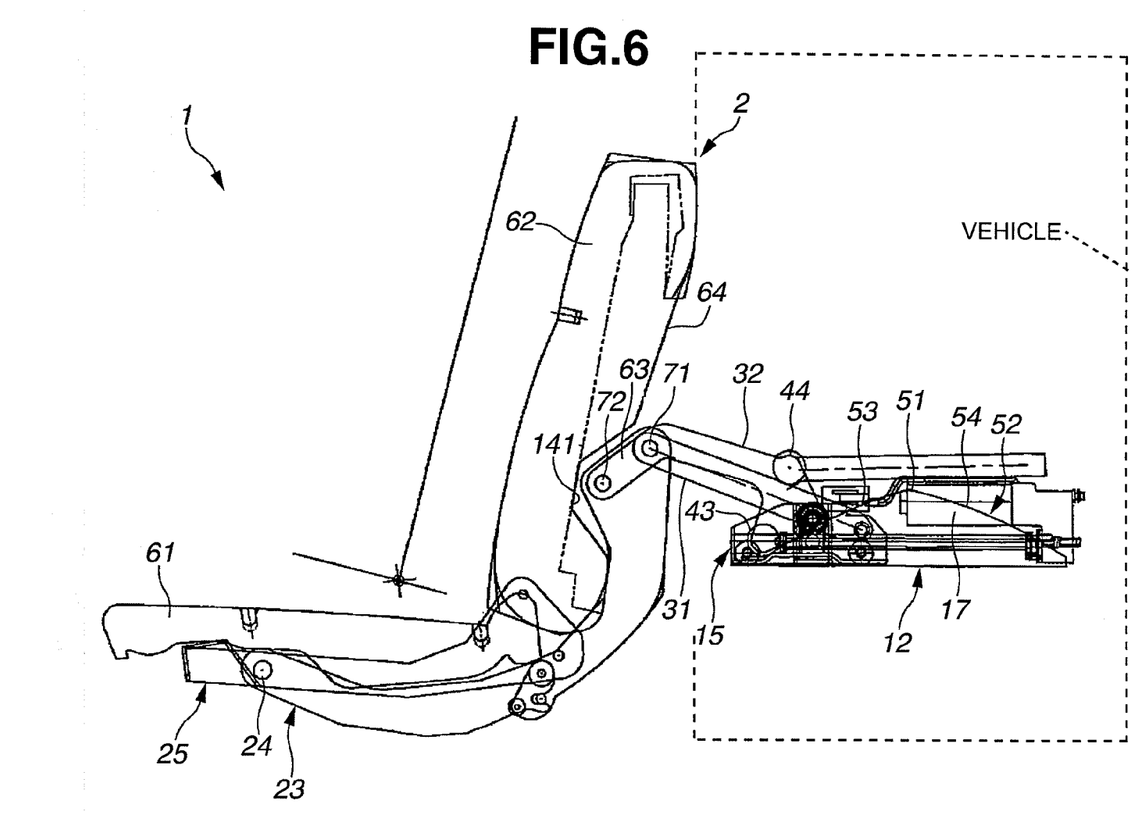
FIG. 6 is a simplified schematic diagram of the seat lifting unit shown in FIG. 1 illustrating the positions of the parts when the seat lifting unit is in a displaced position outside of the vehicle occupant compartment.
Figure 7:
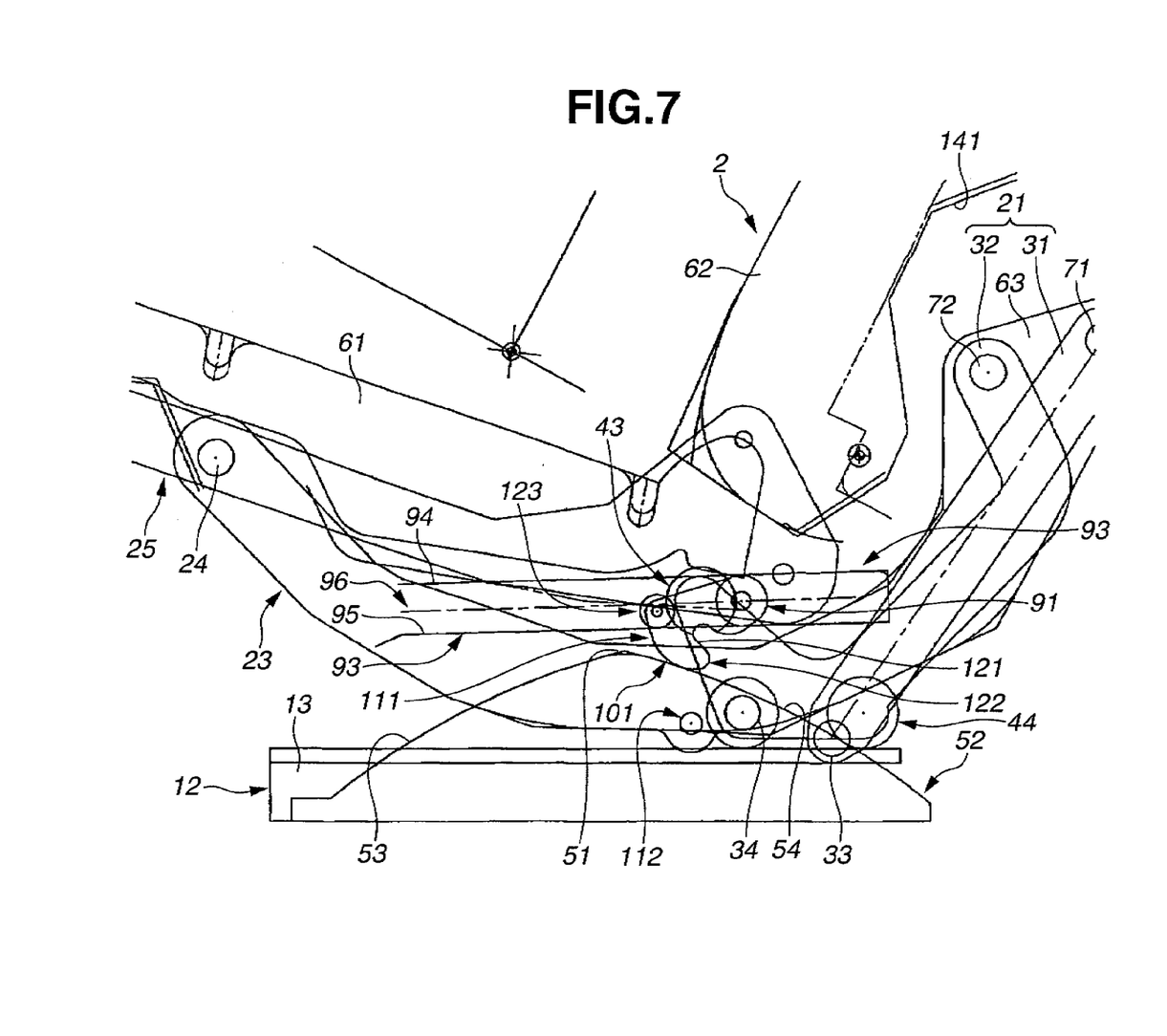
FIG. 7 is a simplified fragmentary enlarged view of the diagram shown in FIG. 1 with unnecessary parts or portions removed to clearly show a lock mechanism in unlocked position.

Referring to initially to FIGS. 1 and 7, a vehicle seat lifting unit 1 is illustrated in accordance with a first embodiment of the present invention. Basically, the vehicle seat lifting unit 1 includes a vehicle seat 2 that is moveable from an initial position (see FIG. 1) inside a vehicle occupant compartment to a displaced position (see FIG. 6) outside of the vehicle occupant compartment. Thus, the seat lifting unit 1 is constructed and arranged so as to lower or lift a vehicle seat 2 during its movement between the initial position (see FIG. 1) inside the vehicle occupant compartment and the displaced position (see FIG. 6) outside of the vehicle occupant compartment. The seat lifting unit 1 is mounted to a vehicle body floor 11. The seat lifting unit 1 has a lower support structure 12. The lower support structure 12 is pivoted on a vehicle body floor 11 within an area adjacent a vehicle door opening. The lower support structure 12 has a slide rail 13 that extends along a predetermined line fixed thereto and a ball screw 16 extending in parallel to the slide rail 13. The slide rail 13 supports a slider 15 provided with wheels 14 to allow sliding movement of the slider 15 relative to the lower support structure 12 along the predetermined path. The slider 15 has a nut of the ball screw 16. The lower support structure 12 has a drive unit 17 including a motor as a driving device for turning the ball screw 16. The slider 15 moves between a retreat position illustrated in FIG. 1 and an advance position illustrated in FIG. 6 by turning the ball screw 16 by the motor of the drive unit 17.

In addition, there is a rotation mechanism, not illustrated, between the lower support structure 12 and the vehicle body floor 11. The rotation mechanism is omitted for simplicity of illustration in FIG. 1.

Referring to FIG. 1, the slider 15 has a lift arm assembly 21, which is designed to support the seat 2. A support mechanism 22 for the seat 2 includes a seat holder 23 supported by the lift arm assembly 21. At a front edge portion, the seat holder 23 has a support axis 24. The support mechanism 22 also includes a seat upper support structure 25 retaining the seat 2. At a front edge portion, the seat upper support structure 25 is pivoted on the seat holder 23 around the support axis 24.

In the seat lifting unit 1, the lift arm assembly 21 cooperates with the slider 15 to support the vehicle seat 2. The lift arm assembly 21 includes an upper or first arm 31, and a lower or second seat 32. The upper arm 31 is pivoted about its base end portion on the slider 15, while the lower arm 32 is pivoted about its base end portion on the slider 15. In detail, the base end portion of the upper arm 31 is supported for rotation about an upper arm support point or axis 33 (see FIG. 7) that is set near the rear edge of the slider 15. The base end portion of the lower arm 32 is supported for rotation about a lower arm support point or axis 34 (see FIG. 7) that is set nearer the front edge of the slider 15 than the upper arm set point 33. This ensures smooth movements of the upper and lower arms 31 and 32 without any interference.

At their tip portions, the upper and lower arms 31 and 32 support the bottom of the seat 2 via the seat holder 23 and the seat upper support structure 25. The seat holder 23 is supported at the tip portions of the upper and lower arms 31 and 32. The seat upper support structure 25 retains the seat 2, and is pivoted on the seat holder 23 around the support axis 24 provided on a front edge portion of the seat holder 23. The upper and lower arms 31 and 32 are constructed and arranged as to take their backwardly tilted positions as illustrated in FIG. 1 when the seat 2 is at an initial position inside the vehicle occupant compartment as illustrated in FIG. 1. When the upper and lower arms 31 and 32 are in their backwardly tilted positions, the tip end portion of the upper arm 31 is located behind its base end portion (support point 33), and the tip end portion of the lower arm 32 is located behind its base end portion (support point 34).

At an upper end portion, the lower arm 32 is curved to form a sloping portion 41 that protrudes and slopes forward and upward to its tip portion. At a lower end portion, the lower arm 32 is curved to form a forwardly protruding portion 42. At a mid point between forward and backward ends thereof, the forwardly protruding portion 42 includes the base end portion of the lower arm 32 so that it may pivot about the lower arm support point 34 together with the lower arm 32. The forwardly protruding portion 42 serves as a cam follower cooperating with a cam surface of a cam plate described later. The forwardly protruding portion 42 is equipped with cam follower parts.

In the illustrated implementation, the lower arm 32 is provided with the cam structure or cam follower including the cam follower parts, but the upper arm 31 may be provided with such a cam follower including cam follower parts. In this case, at a lower end portion, the upper arm 31 is curved to form a forwardly protruding portion. At a mid point between forward and backward ends thereof, this forwardly protruding portion includes the base end portion of the lower arm 31 so that it can pivot about the upper arm support point 33 together with the upper arm 31. This forwardly protruding portion serves as the cam follower including the cam follower parts.

These cam follower parts include a front lower roller 43 that serves as a first cam follower part and a rear lower roller 44 that serves as a second cam follower part. The front lower roller 43 is mounted on the forwardly protruding portion 42 at a front edge portion, and the rear lower roller 44 is mounted on the forwardly protruding portion 42 at a rear edge portion.

Figure 2:
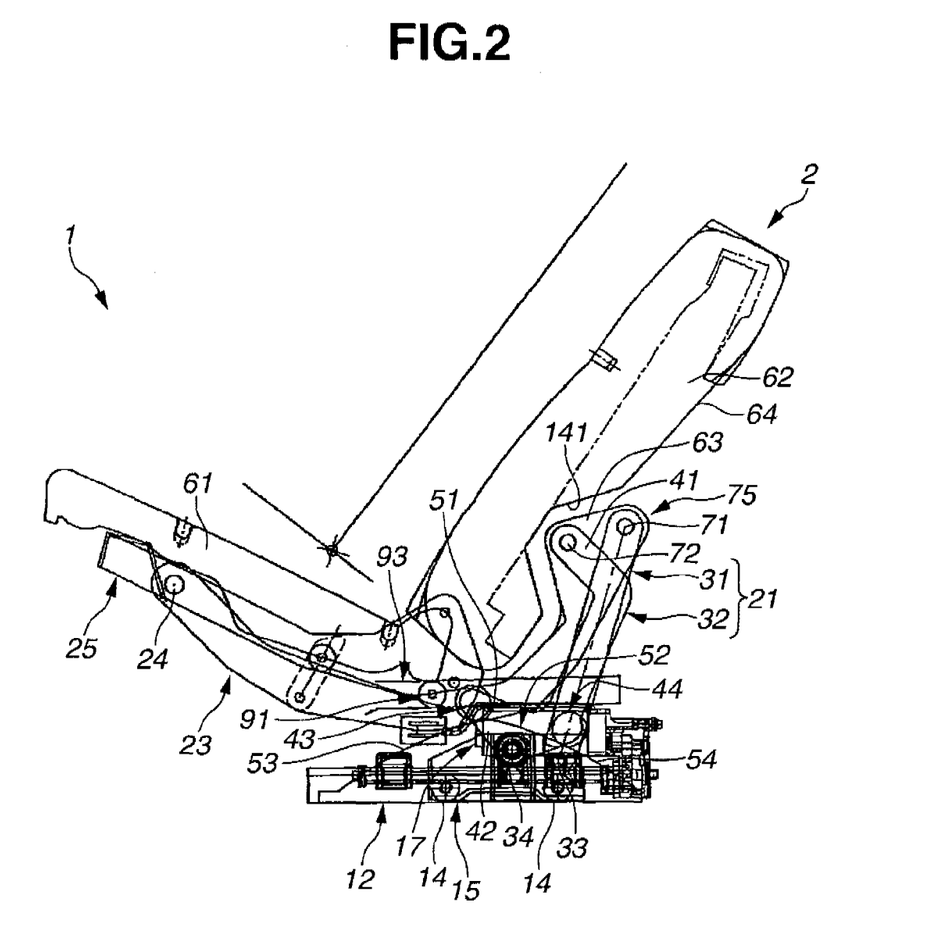
FIG. 2 is a simplified schematic diagram of the seat lifting unit shown in FIG. 1 illustrating the positions of the parts when the seat lifting unit is in a first transient position.
Figure 3:
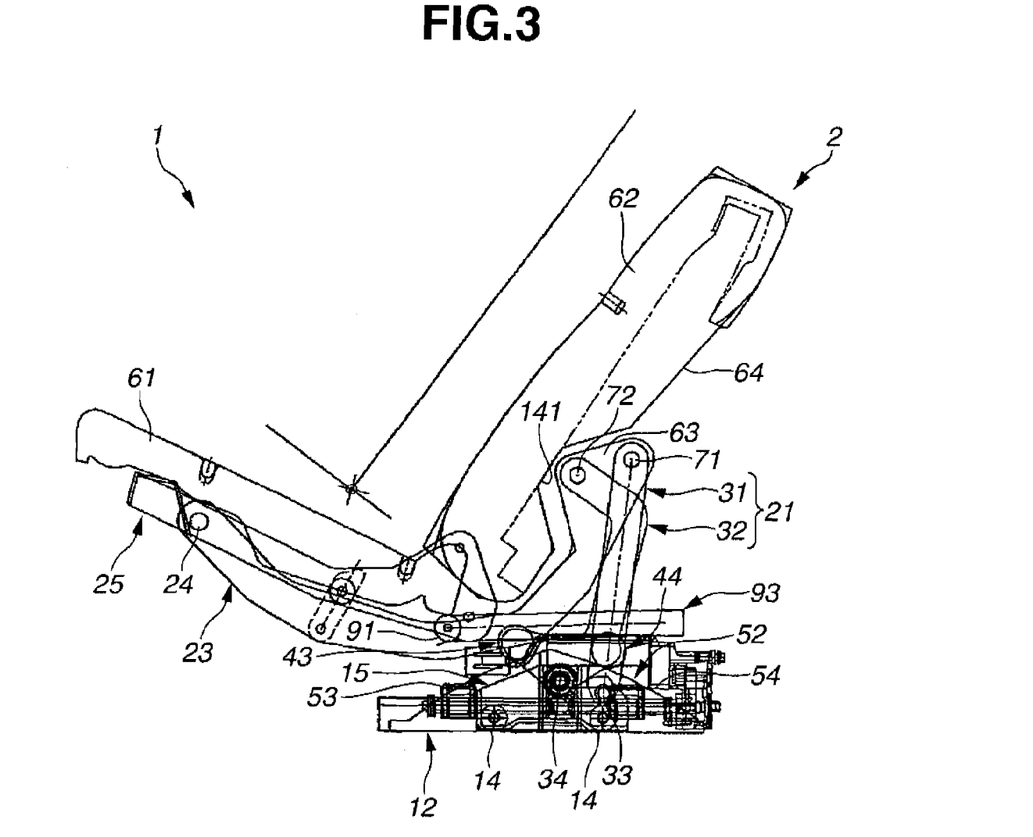
FIG. 3 is a simplified schematic diagram of the seat lifting unit shown in FIG. 1 illustrating the positions of the parts when the seat lifting unit is in a second transient position.

On the other hand, the lower support structure 12 has fixed thereto a cam plate 52 having a mountain-shaped contour with a top or peak 51 in an intermediate part thereof. The cam plate 52 has a descending front cam surface portion 53 on the upper edge of the cam plate 52 in front of the peak 51. The cam plate 52 has an ascending rear cam surface portion 54 behind the peak 51. As shown in FIGS. 1 to 3, the rear lower roller 44 of the lower arm 32 is guided mainly by the rear cam surface portion 54 when the tip portion of the lower arm 32 is located behind the base end portion or the lower arm support point 34. The front lower roller 43 of the lower arm 32 is guided mainly by the front cam surface portion 53 when the tip portion of the lower arm 32 is located in front of the base end portion or the lower arm support point 34. The range over which the lower arm 32 is turned in response to movement of the slider 15 is extended by increasing dimension of length of the cam plate 52. In other words, the cam plate 52 of the mountain-shaped contour is provided on the lower support structure 12, and the cam follower guided by the upper edge of the cam plate 52 is provided on the first or upper arm 31 or the second or lower arm 32. This relationship turns the lift arm assembly 21 in response to the contour of the cam surface of the cam plate 52. Thus, tilting movement of the lower arm 32 causes the cam follower to change from one of the first and second cam follower parts 44 and 43 being guided by the cam plate 52 to the other of the first and second cam follower parts 44 and 43 being guided by the cam plate 52.

The seat lifting unit 1 is advantageous over the conventional seat lifting unit in which lift arms occupy a space on each of the lateral sides of a seat in that it has a reduced lateral dimension. The seat lifting unit 1 is advantageous over the conventional seat lifting unit in which the lift arms remain occupying the space on each of the lateral sides of the seat when a backrest of the seat takes a backwardly reclined position in that it accomplishes effective use of the vehicle occupant compartment.

Referring to FIG. 2, the seat holder 23 is formed in the shape of an arc projecting downward by having a front part in front of a middle arranged under a seat cushion 61 of the seat 2 and a backward part extending upward along a backrest 62 of the seat 2. At a portion near the rear end, the seat holder 23 has a wide region 63. This wide region 63 is arranged at the back surface 64 of the backrest 62 of the seat 2.

On the rear edge side of the wide region 63, which is arranged at the back surface 64 of the seat 2, the seat holder 23 has an upper arm axis support point 71 on which the tip portion of the upper arm 31 pivots. On the front edge side of the wide region 63, the seat holder 23 has a lower arm axis support point 72 on which the tip portion of the lower arm 32 pivots.

This causes the wide region 63 of the seat holder 23, the upper arm 31, the lower arm 32 and the slider 15 to constitute a four-joint linkage mechanism 75. This linkage mechanism 75 turns both of the arms 31 and 32 between their backwardly tilted positions (see FIG. 1), in which the tip portions of the arms 31 and 32 are behind their base end portions, and their forwardly tilted positions (see FIG. 6), in which the tip portions are in front of the base end portions, when the drive unit 17 moves the slider 15 between the retreat position (see FIG. 1) and the advance position (see FIG. 6). Thus, the movement of the linkage mechanism 75 causes shifting of the seat 2 between the initial position 3 (see FIG. 1) and the displaced position (see FIG. 6) by lowering or lifting the seat 2 during movement of the seat 2 relative to the lower support structure 12 along the predetermined line fixed to the lower support structure 12 in response to the turning movements of both of the arms 31 and 32.

Referring to FIGS. 1 and 7, the seat upper support structure 25 has a guided member 91. The guided member 91 is fixedly mounted in the rear of the side of the seat upper support structure 25. The guided member 91 is a roller with an axis 92 fixed to the side of the seat upper support structure 25. In addition, the lower support structure 12 has fixed thereto a guide member 93 guiding the guided member 91. The guide member 93 is an elongate member having a uniform section in the form of inverted C. The guide member 93 includes an upper part 94 and a lower part 95 defining the uniform section. This guide member 93 extends along the predetermined path fixed to the lower support structure 12. In order to allow the guided member 91 to exit and enter the guide member 93, the guide member 93 is open at the front end to provide an open front end 96. This allows the guided member 91 to exit the guide member 93 via the open front end 96 when the seat upper support structure 25 is moved to a predetermined position in response to turning movements of both of the upper and lower arms 31 and 32. In other words, the guide member 93 is open at its front open end 96 (see FIGS. 1 and 7) to allow the guided member 91 to exit the guide member 93 when the seat upper support structure 25 moves beyond the predetermined position (see FIGS. 3 and 9) in response to angular movements of the upper and lower arms 31 and 32 from their backwardly tilted positions (illustrated in FIGS. 1 and 7) toward their forwardly tilted positions (illustrated in FIG. 6). Thus, the seat 2 is supported by the seat upper support structure 25 which is released from the guided by the guide member 93 when the seat 2 moves forwardly beyond a predetermined amount that ranges from the illustrated position in FIG. 1 to the illustrated position in FIG. 3). Then, the guide member 93 extends to guide the guided member 91 of the seat upper support structure 25. A locus of the guided member 91 guided by the guide member 93 sets tilting of the seat 2.

As shown in FIGS. 1 and 7, the guide member 93 extends generally in parallel to that predetermined path along which the slider 15 is moveable relative to the lower support structure 12. In other words, the guide member 93 extends generally in parallel to the predetermined path of the lower support structure 12, providing an arrangement in which the guided member 91 moves forwardly and generally horizontally along the guide member 93 in response to movement of the slider 15. Thus, this movement of the guided member 91 causes the seat upper support structure 25 to move forwardly and to tilt with its front edge lifted.

As seen in see FIGS. 1 and 7, when the upper and lower arms 31 and 32 are in their backwardly tilted positions, the tip portions of the upper and lower arms 31 and 32 are located behind the support axes 33 and 34 of the base end portions of the upper and lower arms 31 and 32, respectively. During forwardly swinging movements of the upper and lower arms 31 and 32 from their backwardly tilted positions, the tip portions of the upper and lower arms 31 and 32 swing forwardly past a first imaginary vertical plane passing through the support axis 33 of the base end portion of the upper arm 31, and then past a second imaginary vertical plane passing through the support axis 34 of the base end portion of the lower arm 32. As the tip portions of the upper and lower arms 31 and 32 swing forwardly past these two imaginary vertical planes, the guided member 91 on the rear edge portion of the seat upper support structure 25 moves forwardly and generally horizontally along the guide member 93 causing the seat upper support structure 25 to move forwardly and to tilt such that its front edge lifted.

In other words, at its front edge portion, the seat upper support structure 25 with the seat 2 mounted thereto is pivoted on the seat holder 23 around the support axis 24, and, at its rear edge portion, the seat upper support structure 25 has the guided member 91 that is guided by the guide member 93 fixed to the lower support structure 12. Thus, moving the seat holder 23 by tilting each of the upper and lower arms 31 and 32 tilts the seat 2 via the seat upper support structure 25.

Also, a seat cushion 61 of the seat 2 is retained by the seat upper support structure 25. The seat upper support structure 25 and the seat cushion 61 tilt together about the guided member 91 with the height of its hip point kept relatively stationary as the front edge of the seat cushion 61 is lifted due to the regulation by the guide member 93 prohibiting the vertical movements of the guided member 91. Thus, this movement of the guided member 91 makes it possible to elevate the occupant's legs and lower the occupant's head by keeping the seat 2 tilted backwardly.

Figure 8:
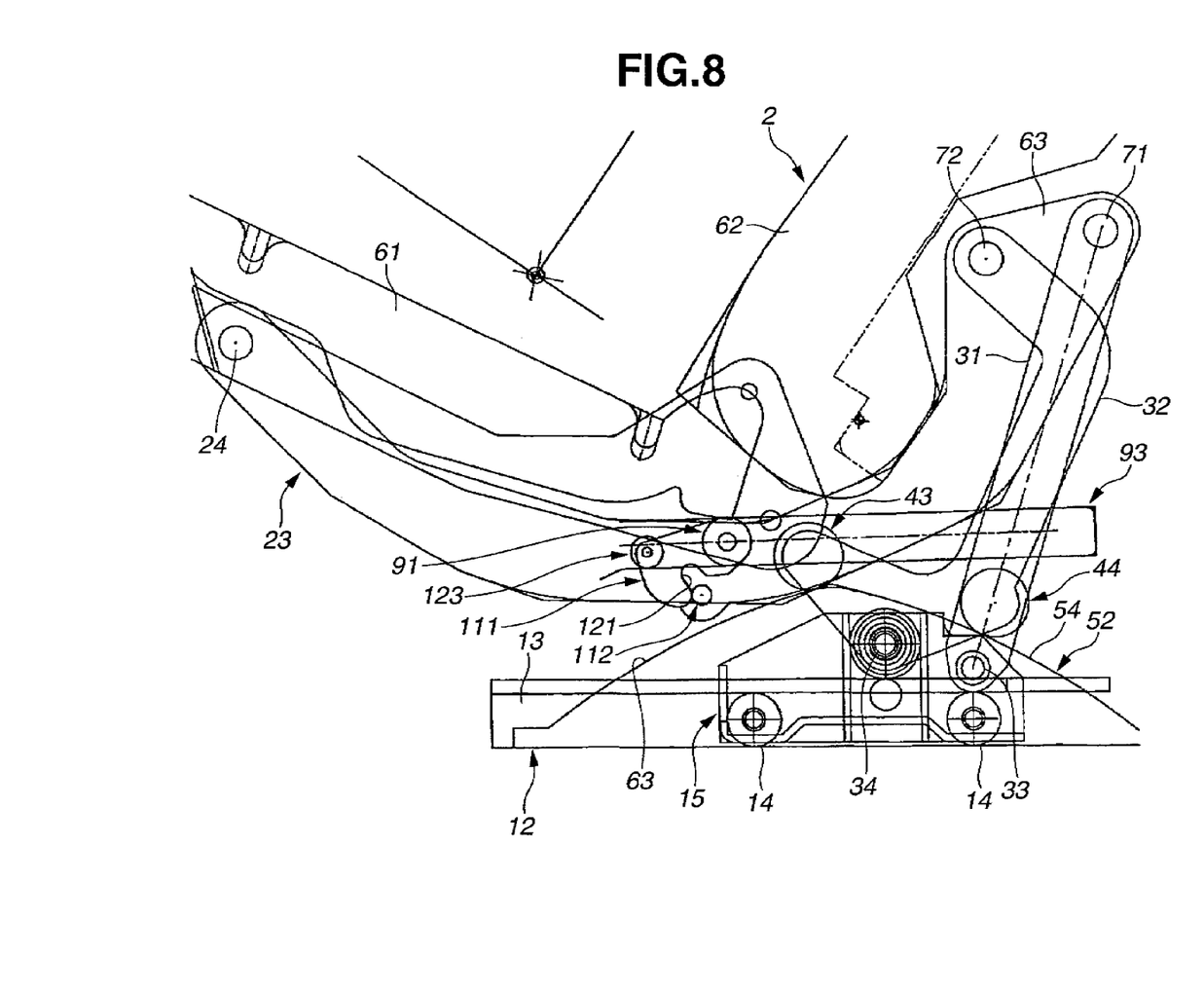
FIG. 8 is a simplified fragmentary enlarged view of the diagram shown in FIG. 2 with unnecessary parts or portions removed to clearly show the lock mechanism about to be locked.
Figure 9:
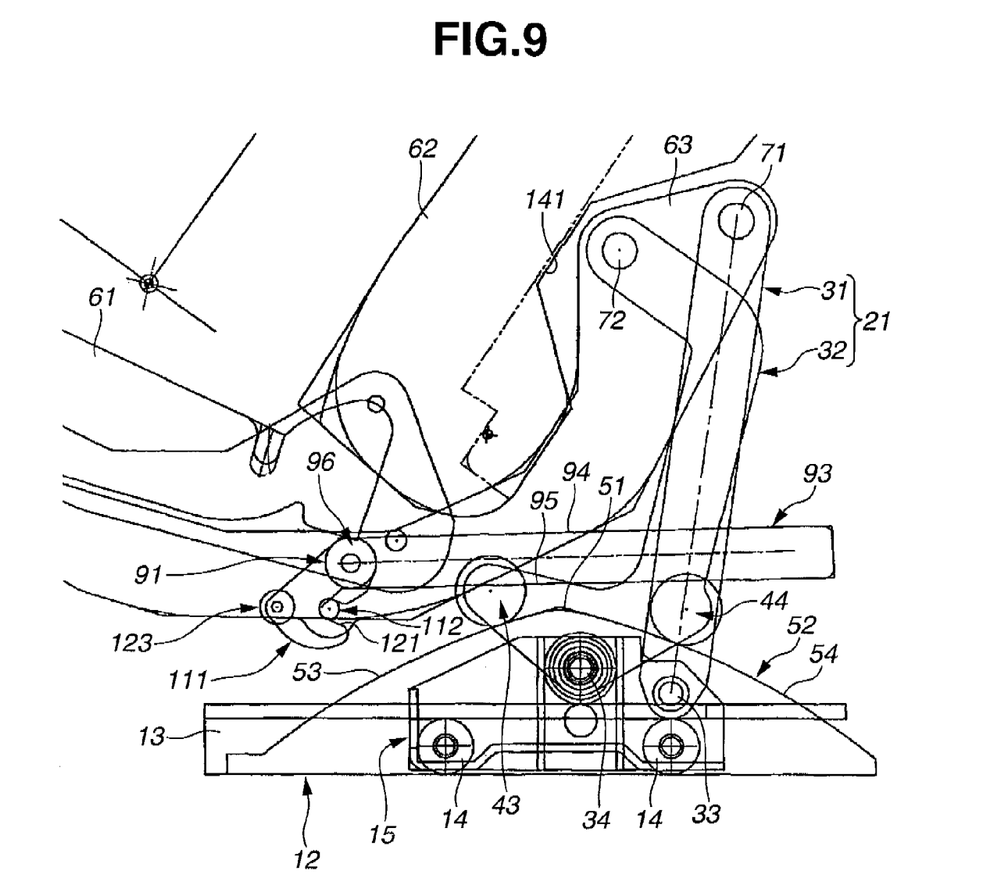
FIG. 9 is a simplified fragmentary enlarged view of the diagram shown in FIG. 3 with unnecessary parts or portions removed to clearly show the lock mechanism in locked position.

As best seen in FIGS. 7-9, the seat lifting unit comprises a lock mechanism 101. The lock mechanism 101 restricts tilting movement of the seat upper support structure 25 relative to the seat holder 23. In particular, the lock mechanism 101 prevents the seat upper support structure 25 from tilting further relative to the seat holder 23 upon the seat upper support structure 25 making a predetermined angle with the seat holder 23, when the seat upper support structure 25 has been tilted relative to the seat holder 23 such that the front edge of the seat upper support structure 25 is lifted.

The lock mechanism 101 includes a lock member 111 and a striker 112. The lock member 111 has a base end portion pivoted about the same axis together with the guided member 91. The striker 112 is mounted on the seat holder 23 for locking engagement into and disengagement out of the lock member 111.

When, in the process of tilting the seat upper support structure 25 relative to the seat holder 23 such that the front edge of the seat upper support structure 25 is lifted, the seat upper support structure 25 will be tilted relative to the seat holder 23 to accomplish the predetermined angle, and the lock mechanism 101 will restrict further tilting movement of the seat upper support structure 25 relative to the seat holder 23 by preventing the seat upper support structure 25 from tilting further relative to the seat holder 23. This will prevent seat cushion 61 from tilting than necessary.

As best seen in FIG. 9, the lock mechanism 101 is locked to restrict the tilting movement of the seat upper support structure 25 relative to the seat holder 23 before the guided member 91 exits the guide member 93. The lock mechanism 101 keeps on restricting the tilting movement of the seat upper support structure 25 relative to the seat holder 23 while the guided member 91 is left as it is after it has left the guide member 93.

In other words, the lock mechanism 101 restricts the tilting movement of the seat upper support structure 25 relative to the seat holder 23 before the guided member 91 exits the guide member 93, and keeps on its lock state (see FIG. 9) after the guided member 91 has left the guide member 93. This prevents unnecessary tilting movement of the seat 2 after the release from the regulation by the guide member 93.

A tip portion of the lock member 111 is formed with a hook portion 122 having an engagement groove 121 for engagement with the striker 112. The hook portion 122 is biased by a spring (not illustrated) in a direction toward the opening of the engagement groove 121. A guide roller 123 that is guided by the guide member 93 is pivoted on a corner of the hook portion 122 to prevent turning movement of the hook portion 122 in the direction toward the opening of the engagement groove 121 while it is rolling on the lower part 95 of the guide member 93.

As shown in FIGS. 7 to 9, the striker 112 on the seat holder 23 approaches the lock member 111 on the seat upper support structure 25 when the drive unit 17 advances the slider 15. As shown in FIG. 9, the striker 112 comes into engagement with the engagement groove 121 of the lock member 111 immediately before the guided member 91 reaches the open end 96 of the guide member 93. Furthermore, the bias force by the spring maintains engagement state between the lock member 111 and the striker 112 after the guided member 111 exits the guide member 93.

This establishes an unlock state as shown in FIG. 7 when the guided member 91 is being guided by the guide member 93 and the guide roller 123 is rolling on the lower part 95 of the guide member 93, but makes a shift to a lock state as shown in FIGS. 8 and 9 immediately before the guided member 91 exits the guide member 93, and maintains the lock state which restricts the seat upper support structure 25 to the seat holder 23 after the guided member 91 has left the guide member 93.

Referring to FIGS. 3-6 and 10, the backrest 62 of the seat 2 has a concave portion 141 recessed inwardly from its back surface 64 in order to avoid interference between the backrest 62 and the upper and lower arms 31 and 32. When the seat 2 is retained by the seat upper support structure 25 and the seat 2 tilts with the front edge lifted during the seat 2 being moving forwardly, the concave portion 141 accommodates the forwardly swinging movements of the upper and lower arms 31 and 32. In other words, the concave portion 141 prevents interference between the backrest 62 and the upper and lower arms 31 and 32 during movements of the upper and lower arms 31 and 32 that move and tilt the seat 2 between the initial position illustrated in FIG. 1 to the displaced position illustrated in FIG. 6.

Figure 10:
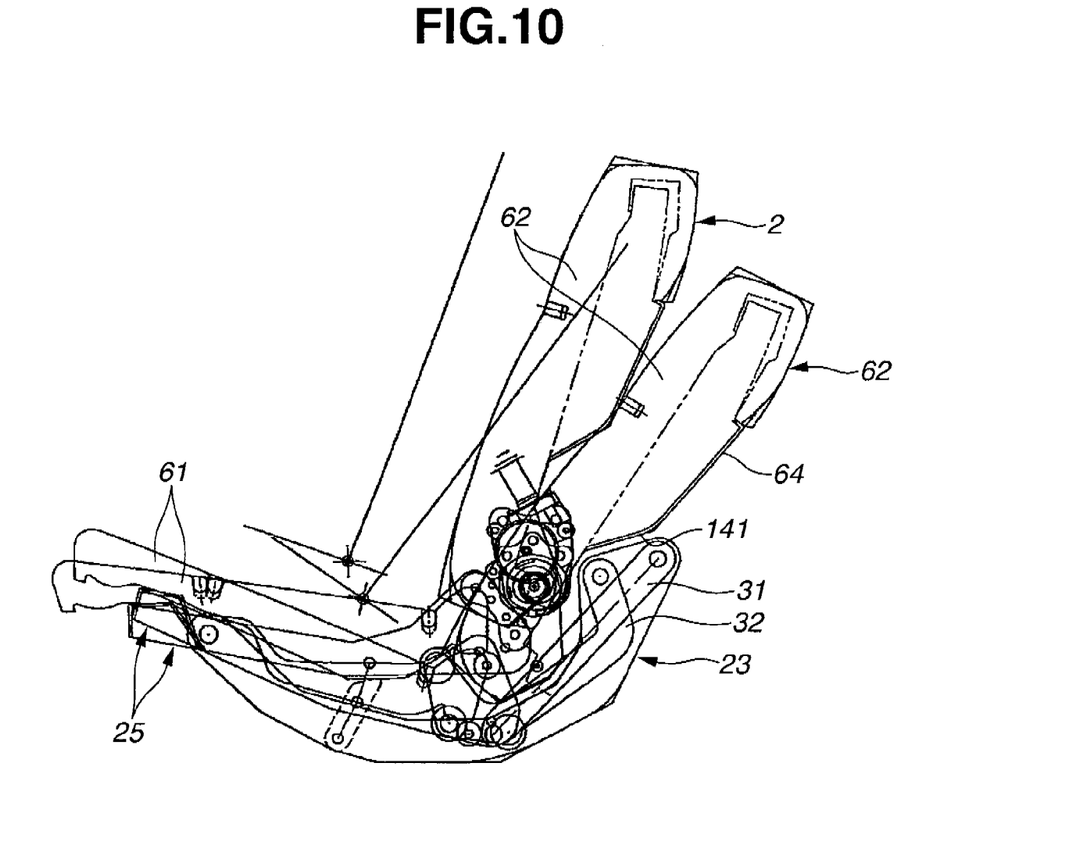
FIG. 10 is a further simplified view of the schematic diagram shown in FIG. 1 with the backwardly tilted vehicle seat illustrated.
Figure 11:
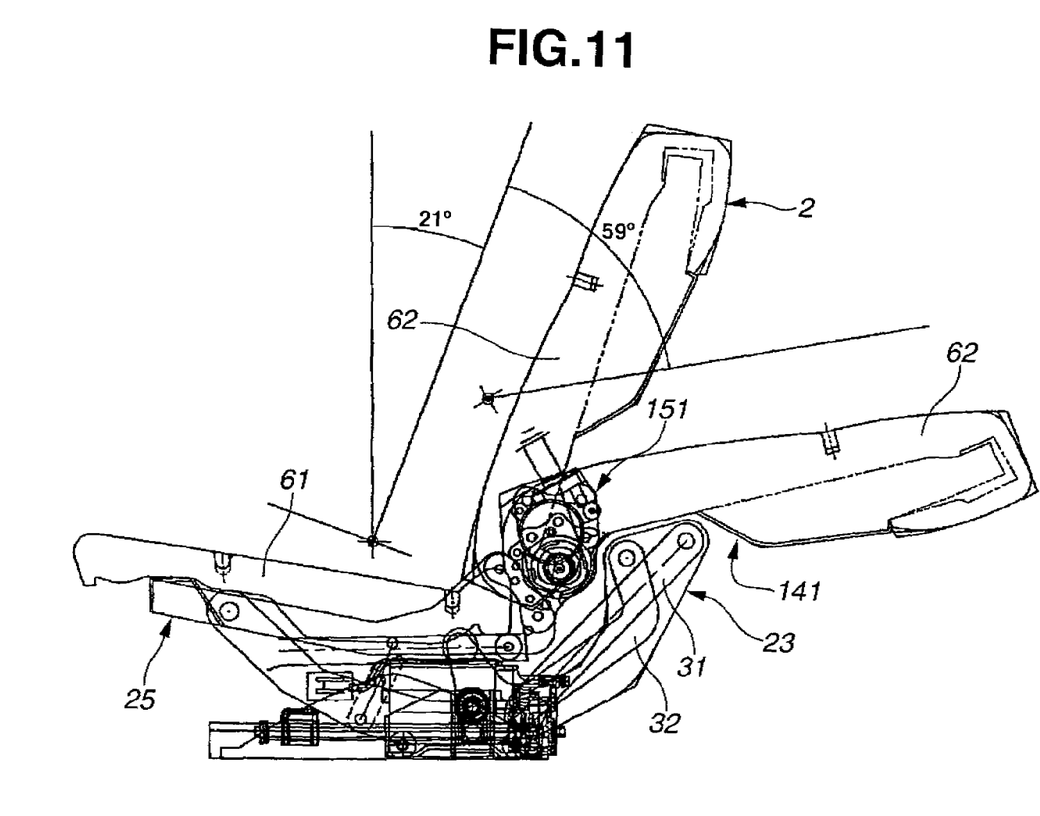
FIG. 11 is a simplified fragmentary diagram of the seat lifting unit shown in FIG. 1 in the initial position inside the vehicle occupant compartment, illustrating a backrest taking a backwardly reclined position.

Referring to FIGS. 10 and 11, the concave portion 141 is recessed inwardly from the back surface 64 of the backrest 62 to avoid interference between the backrest 62 and the upper and lower arms 31 and 32 when the backrest 62 takes a backwardly reclined position. In other words, this concave portion 141 ensures smooth movement of the backrest 62 to the backwardly reclined position illustrated in FIG. 10 by preventing outbreak of interference between the backrest 62 and the upper and lower arms 31 and 32.

In the preceding description, the single concave portion 141 serves not only as a concave recess to avoid interference between both of the arms 31 and 32 and the backrest 62 during the forwardly swinging movements of the arms 31 and 32, but also as a concave recess to avoid interference between both of the arms 31 and 32 and the backrest 62 when the backrest 62 takes the backwardly reclined position. The present invention is not limited to this example. Separately arranged concave recesses may be provided to avoid the interference events.

In the seat lifting unit 1, the upper and lower arms 31 and 32 occupy an area behind the seat 2. In other words, the upper and lower arms 31 and 32 of the lift arm assembly 21 are installed behind the seat 21 with their tip portions supporting the bottom of the seat 2 via the seat holder 23. This maintains quantity of lowering and lifting the seat 2 while holding down rearward protrusion of installation space of the upper and lower arms 31 and 32.

In the previously described seat lifting unit 1, the slider 15 supports the bottom of the seat 2 via the seat holder 23, which the upper and lower arms 31 and 32 support at their tip portions, and the upper and lower arms 31 and 32 take their backwardly tilted positions as illustrated in FIG. 1 when the seat 2 is in the initial position inside the vehicle occupant compartment.

The seat lifting unit 1 is advantageous over the conventional seat lifting unit in which lift arms occupy a space on each of the lateral sides of a seat in that it has a reduced lateral dimension. This makes it easy for the seat lifting unit to install in a vehicle having a narrow indoor width.

The seat lifting unit 1 is advantageous over the conventional seat lifting unit in which the lift arms remain occupying the space on each of the lateral sides of the seat when a backrest of the seat takes a backwardly reclined position in that it accomplishes effective use of the vehicle occupant compartment.

In the seat lifting unit 1, the seat upper support structure 25 is pivoted to the seat holder 23 to tilt the seat 2 during movement of the seat holder 23 in response to tilting of the arms 31 and 32. The guide member 93 extends to guide the guided member 91 of the seat upper support structure 25. A locus of the guided member 91 guided by the guide member 93 sets tilting of the seat 2.

The guide member 93 is open at its front end 96 (see FIGS. 1 and 7) to allow the guided member 91 to exit the guide member 93 when the seat upper support structure 25 moves beyond the predetermined position (see FIGS. 3 and 9) in response to angular movements of the upper and lower arms 31 and 32 from their backwardly tilted positions (illustrated in FIGS. 1 and 7) toward their forwardly tilted positions (illustrated in FIG. 6). Thus, the seat 2 retained by the seat upper support structure 25 is released from the regulation by the guide member 93 when the seat 2 moves forwardly beyond a predetermined amount that ranges from the illustrated position in FIG. 1 to the illustrated position in FIG. 3).

Furthermore, the guide member 93 extends generally in parallel to that predetermined path along which the slider 15 moves relative to the lower support structure 12. During this forward movement of the slider 15, the guided member 91 moves forwardly and generally horizontally along the guide member 93. Thus, this movement of the guided member 91 causes the seat upper support structure 25 to move forwardly and to tilt with its front edge lifted.

Then, the seat cushion 61 of the seat 2 retained by the seat upper support structure 25 tilts about the guided member 91 with the height of its hip point kept stationary as the front edge of the seat cushion 61 is lifted due to the guided by the guide member 93 prohibiting the vertical movement of the guided member 91. Thus, this movement of the guided member 91 makes it possible to elevate the occupant's legs of the seat occupant and lower the occupant's head by keeping the seat 2 tilted backwardly. On this account, the occupant can pass through the door opening with his seated position kept.

In the seat lifting unit 1, when, in the process of tilting the seat upper support structure 25 relative to the seat holder 23 such that the front edge of the seat upper support structure 25 is lifted, the seat upper support structure 25 will be tilted relative to the seat holder 23 to accomplish the predetermined angle, and the lock mechanism 101 will restrict further tilting movement of the seat upper support structure 25 relative to the seat holder 23 by preventing the seat upper support structure 25 from tilting further relative to the seat holder 23. This will prevent seat cushion 61 from tilting than necessary.

The seat lifting unit 1 restricts the tilting movement of the seat upper support structure 25 relative to the seat holder 23 before the guided member 91 exits the guide member 93, and keeps on its lock state (see FIG. 9) after the guided member 91 has left the guide member 93. This prevents unnecessary tilting movement of the seat 2 after the release from the regulation by the guide member 93.

In the seat lifting unit 1, the concave portion 141 prevents interference between the backrest 62 and the upper and lower arms 31 and 32 during movements of the upper and lower arms 31 and 32 to move and tilt the seat 2 between the initial position illustrated in FIG. 1 to the displaced position illustrated in FIG. 6.

In the seat lifting unit 1, the concave portion 141 ensures smooth movement of the backrest 62 to the backwardly reclined position illustrated in FIG. 10 by preventing interference between the backrest 62 and the upper and lower arms 31 and 32.

The seat lifting unit 1 tilts the lift arm assembly 21 including the upper and lower arms 31 and 32 in response to the cam surface by the cam plate 52 provided on the lower support structure 12 and the cam follower parts 43 and 44 provided on the first or second arms 31 or 32. Thus, tilting movement of the arm 32 causes the cam follower to change from one of the cam follower parts 43 and 44 being guided by the cam plate 52 to the other of the cam follower parts 43 and 44 being guided by the cam plate 52.

In the seat lifting unit 1, the upper and lower arms 31 and 32 of the lift arm assembly 21 are installed behind the seat 21 with their tip portions supporting the bottom of the seat 2 via the seat holder 23. This maintains quantity of lowering and lifting the seat 2 while holding down rearward protrusion of installation space of the upper and lower arms 31 and 32.

FIGS. 1 to 6 illustrate positions of parts of the seat lifting unit 1 when the seat lifting unit 1 moves the seat 2 from the initial position inside the vehicle occupant compartment (see FIG. 1) to the displaced position outside the vehicle occupant compartment (see FIG. 6) through the vehicle door opening.

In the illustrated state in FIG. 1, the drive unit 17 is activated to move the slider 15 forwardly as shown in FIG. 2. Then, the lower arm 32 begins to turn counterclockwise about the lower arm support point 34 because the rear lower roller 44 of the lower arm 32 rolls on the rear cam surface portion 54 of the cam plate 52. This moves the seat holder 23, which is supported by the tip portions of the arms 31 and 32, forwardly.

At this time, the guided member 91 that is fixed to the seat upper support structure 25 moves along the guide member 93 that is fixed to the lower support structure 12. Then, the seat upper support structure 25 that is pivoted to the front end portion of the seat holder by the support axis 24 is tilted with its front end lifted.

At this time again, the lower arm 32 turns counterclockwise about the lower arm support point 34 on the slider 15 because the front lower roller 43 of the lower arm 32 rolls on the front cam surface portion 53 of the cam plate 52.

Moving the slider 15 further in the forward direction, as shown in FIG. 3, causes the lower arm 32 to turn to the generally vertical position because the rear lower roller 44 of the lower arm 32 rolls on the cam plate 52. Then, the seat upper support structure 25 tilts further upward as well as moves further forwardly.

Figure 4:
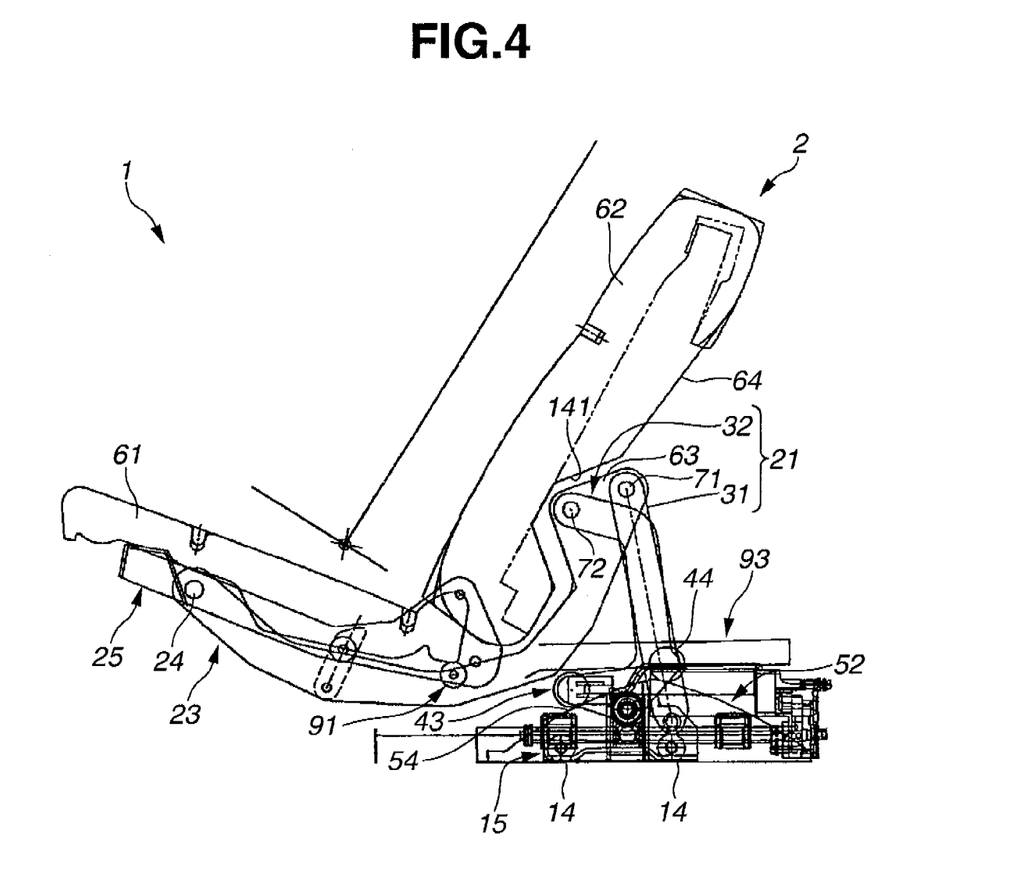
FIG. 4 is a simplified schematic diagram of the seat lifting unit shown in FIG. 1 illustrating the positions of the parts when the seat lifting unit is in a third transient position.

When the lower arm 32 turns to the position in which its tip portion lies in front of its base end portion by moving the slider 15 further in the forward direction, as shown in FIG. 4, the seat upper support structure 25 begins to move downwards and forwardly.

At this time, the tilt of the seat upper support structure 25 is maintained at generally the same level as it is in the illustrated position in FIG. 3 when the guided member 91 of the seat upper support structure 25 has left the guide member 93.

Figure 5:
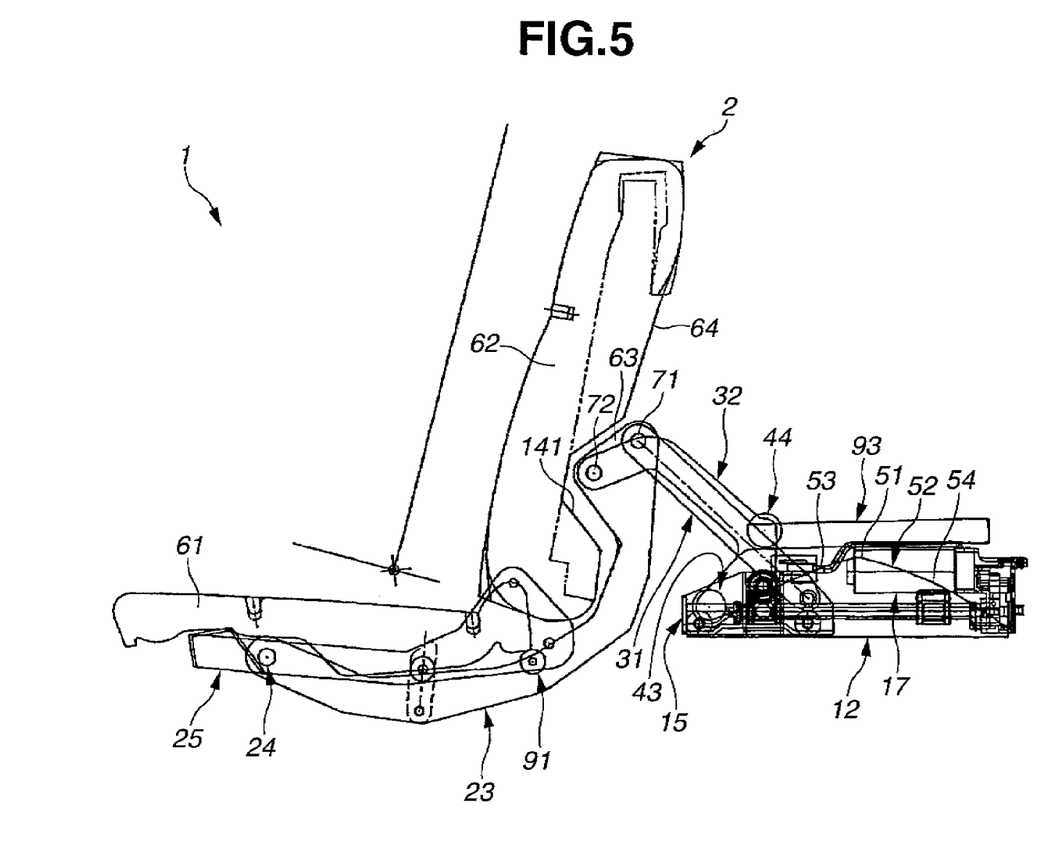
FIG. 5 is a simplified schematic diagram of the seat lifting unit shown in FIG. 1 illustrating the positions of the parts when the seat lifting unit is in a fourth transient position.

Moving the slider 14 further forwardly, as shown in FIG. 5, causes the lower arm 32 to turn until its upper end portion takes generally a front diagonal upward 40 degrees position with respect to its base end portion. Then, the seat upper support structure 25 moves further downward and forwardly.

When, as shown in FIG. 6, the slider 15 has moved to the most advanced position, the lower arm 32 is turned until its upper end portion takes a forward horizontal or front downward position with respect to its base end portion. This causes the seat upper support structure 25 to move forwardly and downwardly to the lowest position of this stroke.

The lower arm 32 and upper arm 31 form a parallel linkage of the inequality length. Thus, the seat upper support structure 25 can be turned to the initial position or a position in which the upper surface of the seat cushion 61 becomes generally horizontal in FIG. 6 from the front upward tilted state in FIGS. 2 to 5 tilted with respect to the initial position in FIG. 1.

The seat lifting unit 1 takes various positions by order of FIG. 6 to FIG. 1 when the seat lifting unit 1 moves the seat 2 from the displaced position outside the vehicle occupant compartment to the initial position inside the vehicle occupant compartment even though the detail description is hereby omitted.

On the other hands, FIGS. 7 to 9 show various positions taken by the seat lifting unit 1 when the guided member 91 of the seat upper support structure 25 is going to exit the guide member 93, illustrating operation of the lock mechanism 101 to prevent the seat upper support structure from tilting further with its front end lifted.

In other words, FIGS. 7 and 8 illustrate states the guide roller 123 of the lock member 111 of the lock mechanism 101 is guided by the guide member 93. At this time, the striker 112 of the lock mechanism 101 is separated from the lock member 111.

And, as shown in FIG. 9, when the guide roller 123 of the lock member 111 exits the guide member 93, the lock member 111 is turned counterclockwise viewing in FIG. 9 about the support point by means of the spring to cause the lock member 101 to catch the striker 112.

In the present implementation of the previously described structure, the lift arm assembly 21 cooperates with the slider 15 to support the seat 2. The lift arm assembly 21 includes the upper or first arm 31 pivoted about its base or lower end portion on the slider 15 and the lower or second arm 32 pivoted about its base end portion on the slider 15. At their tip portions, the upper and lower arms 31 and 32 support the bottom of the seat 2 via the seat holder 23 and the seat upper support structure 25. The upper and lower arms 31 and 32 are constructed and arranged as to take their backwardly tilted positions illustrated in FIG. 1 in which the upper end portion of the upper arm 31 is behind its base or lower end portion and the upper end portion of the lower arm 32 is behind its base or lower end portion when the seat 2 is at the initial position inside the vehicle occupant compartment.

The seat lifting unit 1 according to this implementation is advantageous over the conventional art which has lift arms of a lift arm assembly occupying a space on each of lateral sides of a seat in that it has reduced lateral dimension. Thus, this seat lifting unit 1 is easy to install in a vehicle having a narrow indoor width.

In addition, the seat lifting unit according to this implementation is advantageous over the conventional art which has the lift arms of the lift arm assembly left occupying the space on each of lateral sides of the vehicle occupant compartment when a backrest of the seat takes a backwardly reclined position in that there are no lift arms of the lift arm assembly 21 left occupying a space on each of the lateral sides of the seat 2, allowing effective use of the vehicle occupant compartment. This provides improved advantage and convenience.

Then, the upper arm 31 and the lower arm 32 of the lift arm assembly 21 are located behind or on the rear side of the seat 2 and the tip portion of each of the upper and lower arms 31 and 32 supports the bottom of the seat 2 via the seat holder 23 and the seat upper support structure 25. This accounts for why a lift is maintained with rearward protrusion of the upper and lower arms 31 and 32 reduced.

In addition, as one example of driving mechanisms capable of turning the lift arm assembly 21 that includes the upper and lower arms 31 and 32, the cam plate 52 of the mountain-shaped contour is provided on the lower support structure 12, and the cam follower guided by the upper edge of the cam plate 52 is provided on the lower arm 32. This relationship turns the lift arm assembly 21 in response to the contour of the cam surface of the cam plate 52.

The ascending rear cam surface portion 54 and the descending front cam surface portion 53 are interconnected at the top 51 to make the mountain-shaped contour of the cam plate 52. The cam follower has the two spaced lower rollers, namely the rear lower roller 44 and the front lower roller 43. The rear lower roller 44, which is one example of the first cam follower part, is guided mainly by the rear cam surface portion 54 when the tip portion of the lower arm 32 is located behind the base end portion thereof that is positioned at the lower arm support axis 34. The front lower roller 43, which is one example of the second cam follower part, is guided mainly by the front cam surface portion 53 when the tip portion of the lower arm 32 is located in front of the base end portion thereof that is positioned at the lower arm support axis 34. Thus, tilting movement of the lower arm 32 about the support axis 34 causes the cam follower to change one of the rear lower roller 44 and front lower roller 43 for the other to come into rolling contact with the cam plate 52.

The support mechanism for the seat 2 includes the seat holder 23 supported by the tip portion of the upper arm 31 and the tip portion of the lower arm 32, the seat upper support structure 25, which retains the seat 2, pivoted on the seat holder 23 around the support axis 24 provided on the front edge portion of the seat holder 23, and the guided member 91 provided on a rear edge portion of the seat upper support structure 25. Thus, moving the seat holder 23 by tilting each of the upper and lower arms 31 and 32 tilts the seat 2 via the seat upper support structure 25.

Then, the guide member 93, which is immovable relative to the lower support structure 12, extends to guide the guided member 91 provided on the rear edge portion of the seat upper support structure 25. A locus of the guided member 91 guided by the guide member 93 sets tilting of the seat 2.

The guide member 93 is open at its front end to allow the guided member 91 to exit the guide member 93 when the seat upper support structure 25 moves beyond a predetermined position in response to angular movements of the upper and lower arms 31 and 32 from their backwardly tilted positions toward their forwardly tilted positions. Thus, the seat 2 retained by the seat upper support structure 25 is released from the guided by the guide member 93 when the seat 2 moves forwardly beyond a predetermined amount.

The guide member 93, which guides the guided member 91 of the seat upper support structure 25, extends generally in parallel to the predetermined path of the lower support structure 12 along which the slider 15 moves forwardly or backwardly, providing an arrangement in which the guided member 91 moves forwardly and generally horizontally along the guide member 93 in response to movement of the slider 15, causing the seat upper support structure 25 to move forwardly and to tilt with its front edge lifted.

Then, the seat cushion 61 of the seat 2 retained by the seat upper support structure 25 tilts about the guided member 91 with the height of its hip point kept invariable and its front edge lifted due to the guided by the guide member 93 to prohibit the vertical movement of the guided member 91, making it possible to elevate the occupant's legs and lower the occupant's head by keeping the seat 2 tilted backwardly.

On this account, the seat occupant can pass through the door opening with his seated position kept, providing a technical effect of preventing interference between the head of the seat occupant and the upper edge of the door opening.

When, in the process of tilting the seat upper support structure 25 relative to the seat holder 23 by turning the seat upper support structure 25 with the front edge of the seat upper support structure 25 lifted, the seat upper support structure 25 has tilted relative to the seat holder 23 to accomplish a predetermined angle, the lock mechanism 101 restricts tilting movement of the seat upper support structure 25 relative to the seat holder 23 by preventing the seat upper support structure 25 from tilting further relative to the seat holder 23. This will prevent seat cushion 61 from tilting than necessary.

And, the lock mechanism 101 is locked to restrict the tilting movement of the seat upper support structure 25 relative to the seat holder 23 before the guided member 91 exits the guide member 93. In addition, the lock mechanism 101 keeps on its lock state by restricting the tilting movement of the seat upper support structure 25 relative to the seat holder 23 while the guided member 91 is left as it is after it has left the guide member 93.

This prevents unnecessary tilting movement of the seat 2 after the release from the guided by the guide member 93, allowing the seat 2 to shift to the displaced position as illustrated in FIG. 6 with the tilted angle of the seat cushion 61 kept.

Furthermore, the backrest 62 of the seat 2 has the concave portion 141 recessed inwardly from its back 64 in order to avoid interference between the backrest 62 and the upper and lower arms 31 and 32 when the seat 2 tilts with the front edge thereof lifted during the forwardly swinging movements of the upper and lower arms 31 and 32.

In addition, this concave portion 141 avoids interference between the backrest 62 and the upper and lower arms 31 and 32 when the backrest 62 takes the backwardly reclined position.

While the present invention has been particularly described, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A vehicle seat lifting unit comprising:
    a lower support structure configured to be pivotally mounted on a floor defining a vehicle occupant compartment of a vehicle;
    a slider coupled to the lower support structure to move along a predetermined path relative to the lower support structure;
    a seat;
    a seat holder coupled to the seat;
    a lift arm assembly including a first arm and a second arm that cooperate with the slider and the seat holder to form a linkage mechanism in which each of the first and second arms includes a base end portion pivotally coupled to the slider and a tip portion pivotally coupled to the seat holder with the lift arm assembly being located behind the seat; and
    a drive unit configured to move the slider along the predetermined path between an advance position and a retreat position and to cause the first and second arms of the lift arm assembly to selectively swing from backwardly tilted positions to forwardly tilted positions, which in turn selectively shifts the seat between an initial position inside the vehicle occupant compartment and a displaced position outside the vehicle occupant compartment that is lower than the initial position.

2. The vehicle seat lifting unit as recited in claim 1, further comprising
    a seat upper support structure fixedly mounted to the seat and pivotally coupled to the seat holder to pivot the seat around a support axis located near a front edge portion of the seat holder,
    a guided member provided on a rear edge portion of the seat upper support structure; and
    a guide member fixed relative to the lower support structure and extending to guide the guided member, the guide member being open at its front end to allow the guided member to exit the guide member when the seat upper support structure moves beyond a predetermined position in response to angular movements of the first and second arms from the backwardly tilted positions toward the forwardly tilted positions.

3. The vehicle seat lifting unit as recited in claim 2, wherein
    the guide member extends generally in parallel to the predetermined path of movement of the slider, and,
    the guide member and the guided member are configured and arranged to cooperate such that guided member moves forwardly and generally horizontally along the guide member with the seat upper support structure being moved forwardly and tilted with a front edge of the seat being lifted during forwardly swinging movements of the first and second arms in which the tip portions of the first and second arms swing forwardly past imaginary vertical planes passing through support axes of the base end portions of the first and second arms from the backwardly tilted positions in which the tip portions of the first and second arms are behind the base end portions of the first and second arms.

4. The vehicle seat lifting unit as recited in claim 3, further comprising
    a lock mechanism configured to restrict tilting movement of the seat upper support structure relative to the seat holder by preventing the seat upper support structure from tilting further relative to the seat holder upon the seat upper support structure making a predetermined angle with the seat holder after the seat upper support structure has tilted relative to the seat holder by turning the seat upper support structure relative to the seat holder with the front edge of the seat upper support structure lifted.

5. The vehicle seat lifting unit as recited in claim 4, wherein
    the lock mechanism is configured to restrict the tilting movement of the seat upper support structure relative to the seat holder before the guided member exits the guide member, and
    the lock mechanism is further configured to continue to restrict the tilting movement of the seat upper support structure relative to the seat holder when the guided member exits the guide member.

6. The vehicle seat lifting unit as recited in claim 3, wherein
    the seat includes a backrest that has a concave portion recessed inwardly from a back surface to avoid interference between the backrest and the first and second arms when the seat retained by the seat upper support structure tilts with the front edge of the seat being lifted and while the seat is moving forwardly during the forwardly swinging movements of the first and second arms.

7. The vehicle seat lifting unit as recited in claim 3, wherein
    the seat includes a backrest that has a concave portion recessed inwardly from its back surface to avoid interference between the backrest and the first and second arms when the backrest takes a backwardly reclined position.

8. The vehicle seat lifting unit as recited in claim 1, further comprising
    a cam plate provided on the lower support structure, with the cam plate having a mountain-shaped contour with a peak located in an intermediate part of the mountain-shaped contour; and
    a cam follower provided on one of the first and second arms, the cam follower including a first cam follower part engaged with the cam plate when the tip portion of the one of the first and second arms having the cam follower is located behind the base end portion of the one of the first and second arms having the cam follower, and a second cam follower part engaged with the cam plate when the tip portion of the one of the first and second arms having the cam follower is in front of the base end portion of the one of the first and second arms having the cam follower.

9. The vehicle seat lifting unit as recited in claim 1, wherein
    the first and second arms occupy areas on first and second lateral sides of the seat, respectively.

10. The vehicle seat lifting unit as recited in claim 1, further comprising
    a cam structure arranged to tilt one of the first and second arms when the slider moves between the retreat position and the advance position.

11. The vehicle seat lifting unit as recited in claim 10, wherein
    the cam structure includes
        a cam plate fixed to the lower support structure, the cam plate including an ascending rear cam surface portion and a descending front cam surface portion connected to the ascending rear cam surface portion via a peak; and
        a pair of cam rollers fixed to one of the first and second arms to follow at least one of the ascending rear cam surface portion and the descending rear cam surface portion when the slider moves between the retreat position and the advance position.

12. The vehicle seat lifting unit as recited in claim 1, further comprising
    a four-joint linkage mechanism including the first arm having a base end portion pivotally coupled to the slider and a tip portion pivotally coupled to a backward part of the seat holder, and the second arm having a base end portion pivotally coupled to the slider and a tip portion pivotally coupled to the backward part of the seat holder,
    a cam plate fixed to the lower support structure, the cam plate including an ascending rear cam surface portion and a descending front cam surface portion connected to the ascending rear cam surface portion via a peak, and
    a cam follower including a pair of cam rollers fixed to one of the first and second arms to follow at least one of the ascending rear cam surface portion and the descending rear cam surface portion when the slider moves between the retreat position and the advance position.

* * * * *